(12) United States Patent
Loxterkamp et al.

(10) Patent No.: US 7,574,852 B1
(45) Date of Patent: Aug. 18, 2009

(54) MULTI-BLADED CUTTING DECK WITH ADJUSTABLE FLOW CONTROL BAFFLES

(75) Inventors: Joe A. Loxterkamp, Beatrice, NE (US); Steven C. Finkner, Adams, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 0 days.

(21) Appl. No.: 11/586,440

(22) Filed: Oct. 25, 2006

(51) Int. Cl.
*A01D 67/00* (2006.01)
(52) U.S. Cl. .................................................... 56/320.2
(58) Field of Classification Search ................... 56/202, 56/320.2, 16.6, 6
See application file for complete search history.

(56) References Cited

U.S. PATENT DOCUMENTS

| | | | |
|---|---|---|---|
| 3,157,014 A * | 11/1964 | Bottenberg ....................... | 56/6 |
| 3,469,376 A | 9/1969 | Bacon | |
| 3,818,687 A | 6/1974 | Houst et al. | |
| 3,893,284 A | 7/1975 | Thon et al. | |
| 3,925,972 A * | 12/1975 | Andersson ................. | 56/320.2 |
| 4,226,074 A * | 10/1980 | Mullet et al. ............... | 56/320.2 |
| 4,335,567 A * | 6/1982 | Comer ....................... | 56/12.7 |
| 4,435,949 A | 3/1984 | Heismann | |
| 5,040,364 A * | 8/1991 | Deegan ...................... | 56/320.2 |
| 5,179,823 A | 1/1993 | Pace | |
| 5,205,112 A | 4/1993 | Tillotson et al. | |
| 5,214,906 A * | 6/1993 | Saki et al. .................. | 56/320.2 |
| 6,192,666 B1 | 2/2001 | Sugden et al. | |
| 6,609,358 B1 * | 8/2003 | Schmidt et al. ............ | 56/320.2 |
| 6,735,932 B2 | 5/2004 | Osborne | |
| 6,862,875 B2 | 3/2005 | Iida | |
| 6,910,324 B2 | 6/2005 | Kakuk | |
| 7,051,504 B2 * | 5/2006 | Osborne .................... | 56/320.2 |
| 7,093,415 B2 | 8/2006 | Kallevig et al. | |
| 7,204,073 B1 * | 4/2007 | Chenevert ................. | 56/320.2 |
| 2004/0128970 A1 * | 7/2004 | Gazlay ....................... | 56/320.2 |

FOREIGN PATENT DOCUMENTS

EP  0981943  3/2000

OTHER PUBLICATIONS

"Honda's HRX Goes Electric" Press Release, Sep. 24, 2004 Portion describing Clip Director lever.

* cited by examiner

*Primary Examiner*—Árpád Fábián-Kovács
(74) *Attorney, Agent, or Firm*—James W. Miller

(57) ABSTRACT

A rotary cutting deck for a mower has dual, side-by-side cutting chambers that discharge their grass clippings through a common, rearwardly extending exit tunnel. A pair of pivotal flow control baffles are positioned ahead of the mouth of the exit tunnel. The baffles have an open position in which the baffles clear the mouth of the exit tunnel and form guide channels in concert with some of the walls of the cutting chambers which help direct the grass clippings from each cutting chamber towards the mouth of the exit tunnel. The baffles can be pivoted to a closed position in which the baffles block but do not completely close the mouth of the exit tunnel to provide the operator with some way of controlling how long it takes to fill a grass collector attached to the exit tunnel. A mulching plug with a forwardly extending separator vane can be inserted into the mouth of the exit tunnel to convert the deck from a discharge/collection mode of operation to a mulching mode of operation.

17 Claims, 9 Drawing Sheets

MULTI-BLADED CUTTING DECK WITH ADJUSTABLE FLOW CONTROL BAFFLES

TECHNICAL FIELD

This invention relates generally to multi-bladed cutting decks for mowers used for cutting grass and the like. More particularly, this invention relates to such cutting decks that discharge the grass clippings created by the action of the blades through a common exit tunnel.

BACKGROUND OF THE INVENTION

Mowers having a plurality of rotary cutting blades that rotate in substantially horizontal cutting planes are well known for cutting grass. The blades in such a multi-bladed mower are typically carried on a large cutting deck that is coupled to a traction frame of some type. The traction frame often comprises part of a vehicle that carries a seated or standing operator. Mowers of this type are particularly well suited for mowing large areas of grass because of the use of a riding vehicle to carry the cutting deck as well as the large size of the cutting deck.

Multi-bladed cutting decks are often designed to discharge the grass clippings created by the blades through a common exit tunnel. For example, in a cutting deck having two side-by-side cutting blades, the blades are often rotated in opposite directions. The grass clippings generated by each blade are directed towards the center of the deck and merge with each other to form a stream of grass clippings that are projected rearwardly on the deck along the center of the deck. A rear discharge opening is provided at the rear and the center of the deck for receiving this stream of grass clippings and for discharging the grass clippings from the deck. The rear discharge opening is formed by the open mouth of a rearwardly extending exit tunnel through which the grass clippings pass as they discharge from the deck.

The exit tunnel that carries the grass clippings is often connected to some type of grass bagger or collector for collecting the clippings and for preventing the clippings from being discharged onto the ground. However, when such a collector is used, it must be manually dumped or emptied when it becomes filled. This requires the operator to stop mowing, to drive the mower to some area where the clippings can be dumped, and to then dump the clippings by pivoting the collector on the mower in a dumping operation or otherwise removing the collector. Once the collector is emptied, the operator can then drive back to where he or she had stopped mowing to resume mowing.

The collectors often used on mowers of this type necessarily have a somewhat limited capacity due to the additional weight the mower is required to carry as the collector fills. Use of counterweights for stability reasons imposes an additional weight penalty that the mower must carry. As a practical matter, mower mounted grass collectors are relatively small in size in comparison with the volume of grass clippings that can be produced by the action of multiple cutting blades.

Consequently, when a grass collector is used to collect the grass clippings from a multi-bladed cutting deck, the collector will often have to be emptied quite frequently. This interrupts the mowing operation as noted above The need to break away from mowing at frequent intervals to go dump the grass clippings reduces the productivity of such mowers.

Cutting decks of this type can be converted into a mulching mode by closing off the exit tunnel in some fashion. The grass clippings are thus prevented from being discharged from the deck but instead circulate around the various cutting chambers until they are discharged or fall out of the open bottom face of the cutting chambers. However, since the clippings from the multiple blades are merged into a single rearwardly directed stream of clippings, the deck tends to discharge the clippings in somewhat of a central windrow. This is not optimal mulching performance since the windrow containing the grass clippings will at least be partially visible on top of the cut grass path. It would be an advance in the art if the grass clippings were better distributed on the surface of the cut grass path when the deck is converted into a mulching mode.

In addition, mowers of this type are converted between the mulching mode and the discharge/collection mode of operation in an all or nothing manner. In other words, the deck is either used for mulching or it is used to discharge the grass clippings onto the ground or into a grass collector. Other than for choosing between one of these two modes, the operator has little control over how quickly the grass clippings pass out of the cutting deck in the discharge/collection mode of operation. It would be another advance in the art to give the operator some way to adjust how quickly the grass collector fills.

SUMMARY OF THE INVENTION

One aspect of this invention relates to a rotary cutting deck for a mower. The cutting deck has a pair of cutting chambers with rotary cutting blades that discharge grass clippings through a common exit tunnel. The exit tunnel has a mouth through which the grass clippings pass to enter the exit tunnel. A pair of baffles are selectively positionable by an operator in closed positions on the cutting deck in advance of the exit tunnel in the path of the grass clippings approaching the mouth of the exit tunnel. The baffles in their closed positions collectively block at least a portion of the mouth of the exit tunnel.

Another aspect of this invention relates to a rotary cutting deck for a mower. The cutting deck has dual, side-by-side, downwardly facing cutting chambers having generally C-shaped peripheral walls with an open part, wherein the C-shaped peripheral walls that define the cutting chambers face one another with the open parts of the C-shaped peripheral walls facing one another over a central portion of the cutting deck. A cutting blade is contained in each cutting chamber. Each cutting blade is rotatable about a substantially vertical axis in a horizontal cutting plane to cut grass and create grass clippings. The cutting blades in the dual chambers rotate in opposite directions. A rearwardly extending exit tunnel is located on the cutting deck between the rotational axes of the cutting blades in a position to intercept the grass clippings created by the cutting blades. The exit tunnel has a forwardly facing mouth through which the grass clippings pass to enter the exit tunnel. A pair of pivotal flow control baffles are pivotally attached to the cutting deck adjacent opposite lateral sides of the mouth of the exit tunnel and extend forwardly therefrom. Each flow control baffle pivots between an open position in which the flow control baffle clears the mouth of the exit tunnel and helps direct grass clippings from an adjacent cutting chamber into the mouth and a closed position in which the flow control baffle partially but does not completely block the mouth of the exit tunnel to prevent a portion of the grass clippings from the adjacent cutting chamber from entering the mouth of the exit tunnel.

A further aspect of this invention relates to a rotary cutting deck for a mower. The cutting deck is convertible between a discharge/collection mode of operation and a mulching mode of operation. The cutting deck has dual, side-by-side, downwardly facing cutting chambers that are open to another over a central portion of the cutting deck. A cutting blade is contained in each cutting chamber. Each cutting blade is rotatable about a substantially vertical axis in a horizontal cutting plane to cut grass and create grass clippings. The cutting blades in the dual chambers rotate in opposite directions. A rearwardly extending exit tunnel is provided to discharge the grass clippings created by the cutting blades from the cutting deck in the discharge/collection mode of operation. The exit tunnel has a forwardly facing mouth. A plug is insertable into the mouth of the exit tunnel for blocking the mouth of the exit tunnel to convert the deck to the mulching mode of operation. The plug includes a substantially vertical separator vane that extends far enough forwardly from the plug to help keep the grass clippings generated in each cutting chamber substantially isolated from each other such that the grass clippings are kept circulating within the cutting chambers in which they were generated until the grass clippings fall downwardly out of the cutting chambers.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 3:
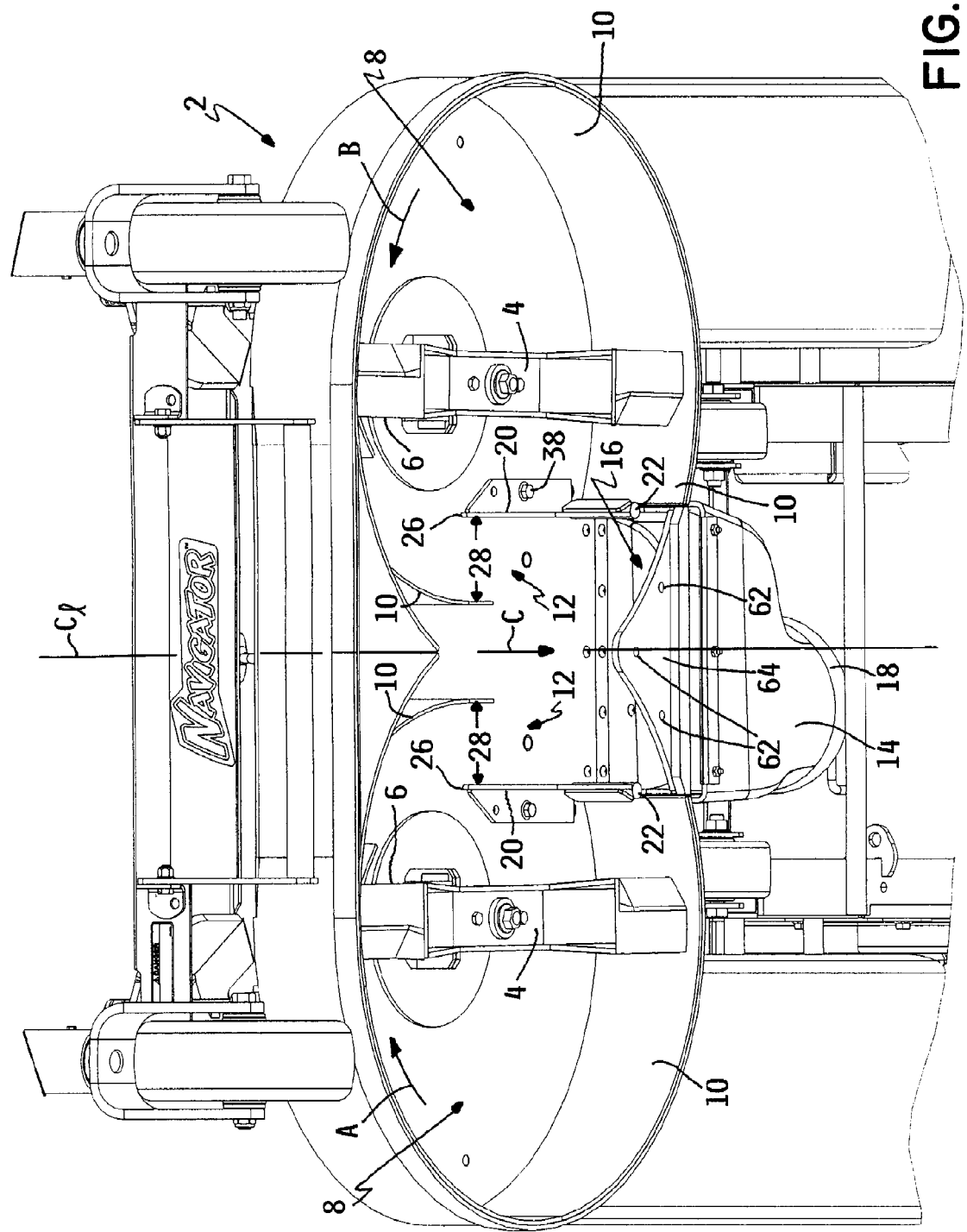
FIG. 3 is a perspective view of the underside of the cutting deck and of the flow control baffles of FIG. 1, particularly illustrating the baffles in their open position.

A rotary cutting deck according to this invention is illustrated generally as 2 connected to the front of a riding mower 3. Rotary cutting deck 2 is so named because the grass is cut by multiple cutting blades 4 each of which rotates in horizontal cutting planes. Both such cutting blades 4 are shown in FIG. 3. Because the orbits of the tips of blades 4 overlap over the centerline $c_l$ of rotary cutting deck 2, cutting blades 4 are timed in their rotation so as not to hit one another. For example, cutting blades 4 could be rotated by a belt drive system utilizing a cogged timing belt, gearbox, or the like.

Each cutting blade 4 has sharpened cutting edges 6 which sever uncut grass as cutting blades 4 are rotated in their horizontal cutting planes. See FIGS. 3 and 5. The height of cut can be adjusted by changing the vertical height of rotary cutting deck 2 above the ground in ways that are well known in the grass mowing art.

The underside of rotary cutting deck 2 has dual, generally circular, side-by-side cutting chambers 8. Each cutting chamber 8 is defined by a curved, peripheral wall 10 that is C-shaped and which extends around a portion of the front and back and around one outer side of rotary cutting deck 2. Open part 12 of C-shaped wall 10 is at the interior of rotary cutting deck 2 generally in the center of rotary cutting deck 2. The purpose of open part 12 of C-shaped wall 10 is to let dual cutting chambers 8 be open to or communicate with one another along the centerline $c_l$ of rotary cutting deck 2.

As noted earlier, cutting blades 4 are rotated by any suitable belt drive system or other drive system as is well known in the mower art such that cutting blades 4 rotate oppositely to one another without hitting one another. Looking at rotary cutting deck 2 shown in FIG. 3, if one cutting blade 4 rotates clockwise as is indicated by the arrow A, then the other cutting blade 4 rotates counterclockwise as is indicated by the arrow B. Thus, the grass clippings being cut in each cutting chamber 8 will merge or commingle with one another to form a common stream of grass clippings located generally in the center of rotary cutting deck 2 between the rotational axes of cutting blades 4. The grass clipping stream will be directed rearwardly towards the rear of rotary cutting deck 2 as indicated by the arrow C in FIG. 3.

A rearwardly directed exit tunnel 14 is provided at the rear of rotary cutting deck 2 to form a rear exit for the grass clipping stream. Referring to FIG. 3, the exit tunnel has a mouth 16 that extends between cutting chambers 8 at the rear of cutting deck 2. Mouth 16 of exit tunnel 14 is centered on the longitudinal centerline $c_l$ of cutting deck 2 and is wide enough to receive the grass clipping stream passing rearwardly from cutting blades 4. Exit tunnel 14 itself can have various shapes and lengths. A discharge outlet 18 on the rear end of exit tunnel 14 can be connected to a grass deflector (not shown) for discharging the grass clipping stream onto the ground or to a grass collector (not shown) for collecting and holding the grass clipping stream.

A pair of pivotal flow control baffles 20 are mounted to cutting deck 2 for pivoting about vertical pivot pins 22. Each pivot pin 22 for each baffle 20 is located adjacent to one of the lateral sides of mouth 16 of exit tunnel 14, i.e. adjacent to either the left or right side of mouth 16. This location coincides with the rear end of the arcuate C-shaped wall 10 of one cutting chamber 8 since mouth 16 of exit tunnel 14 spans across the rear of cutting deck 2 substantially the entire distance between the rear ends of the two C-shaped walls 10 of both cutting chambers 8. Each baffle 20 extends forwardly relative to cutting deck 2 from its respective pivot pin 22 through open part 12 of C-shaped wall 10 of each cutting chamber 8. See FIG. 3.

Figure 5:
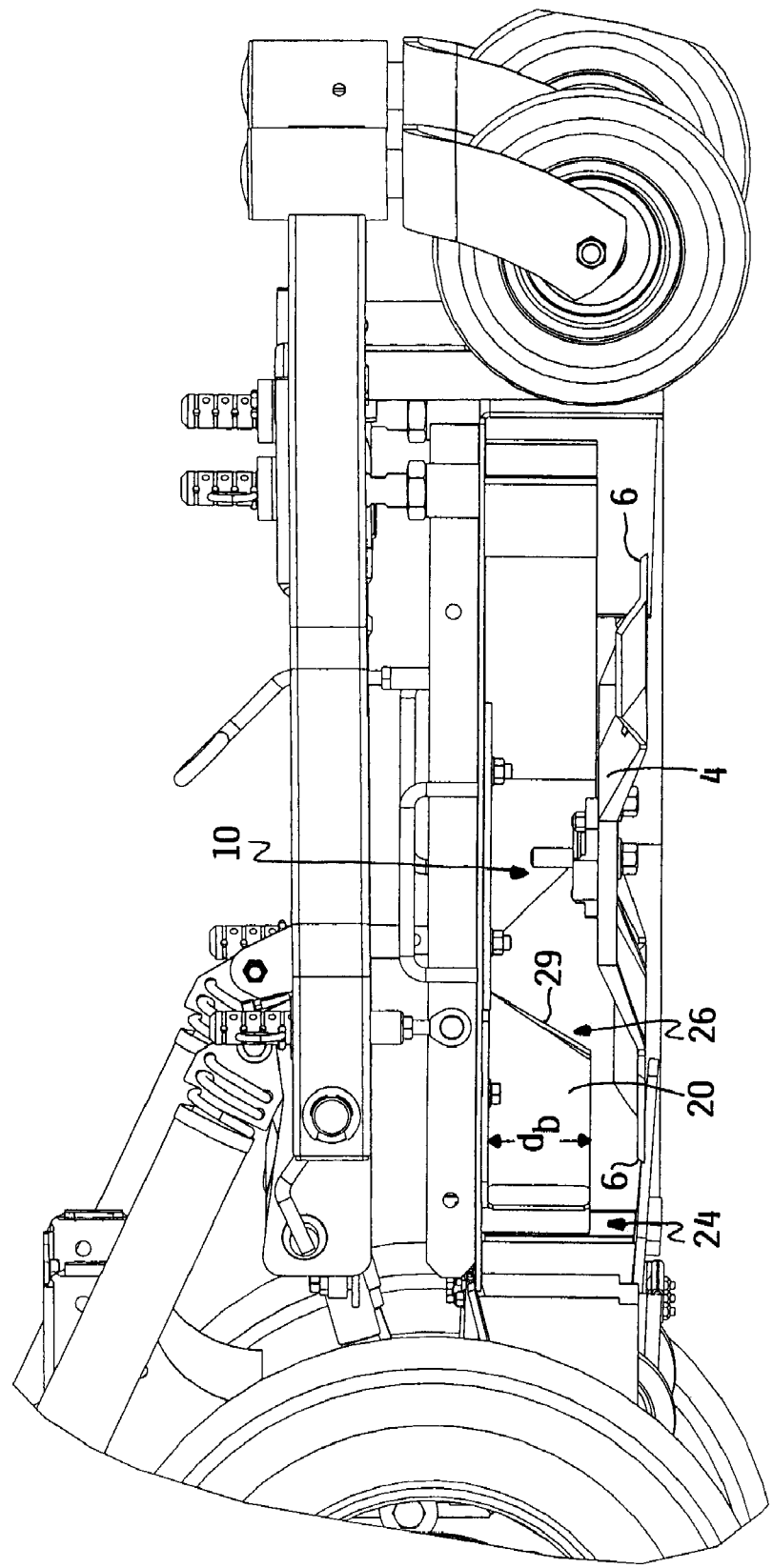
FIG. 5 is a side elevational view of the flow control baffles of FIG. 1, particularly illustrating the baffles in their closed position.

Referring now to FIG. 5, each baffle 20 overlies part of the orbit of the cutting blade in its respective cutting chamber 8. Thus, each baffle 20 has to have a depth $d_b$ that is somewhat less than the maximum depth of cutting chamber 8 to provide clearance for cutting blade 4. The same is true for any portion of C-shaped wall 10 that might overlie the orbit of cutting blade 4, i.e. that portion of wall 10 must also terminate above cutting blade 4 to provide blade clearance. Each baffle 20 is located at the very top of cutting chamber 8 such that a lower portion 24 of mouth 16 of exit tunnel 14 is continuously open below baffles 20.

Flow control baffles 20 are pivotal between two different flow control positions. The first or open position of flow control baffles 20 is shown in FIG. 3. In this position, each baffle 20 extends forwardly to be positioned well inside open part 12 of each C-shaped wall 10. In fact, as shown in FIG. 3, in the open baffle position, each baffle 20 extends forwardly along a straight line that is substantially parallel to the centerline $c_l$ of cutting deck 2. In this position, tip 26 of baffle 20 and the front end of C-shaped wall 10 form a channel 28. The grass clippings being produced in each cutting chamber are directed or funneled by baffle 20 through channel 28 where they merge with the grass clippings from the other cutting chamber to form the rearwardly directed grass clipping stream. This stream will be channeled or directed though mouth 16 of exit tunnel 14 and into exit tunnel 14 in a substantially unobstructed manner.

Figure 4:
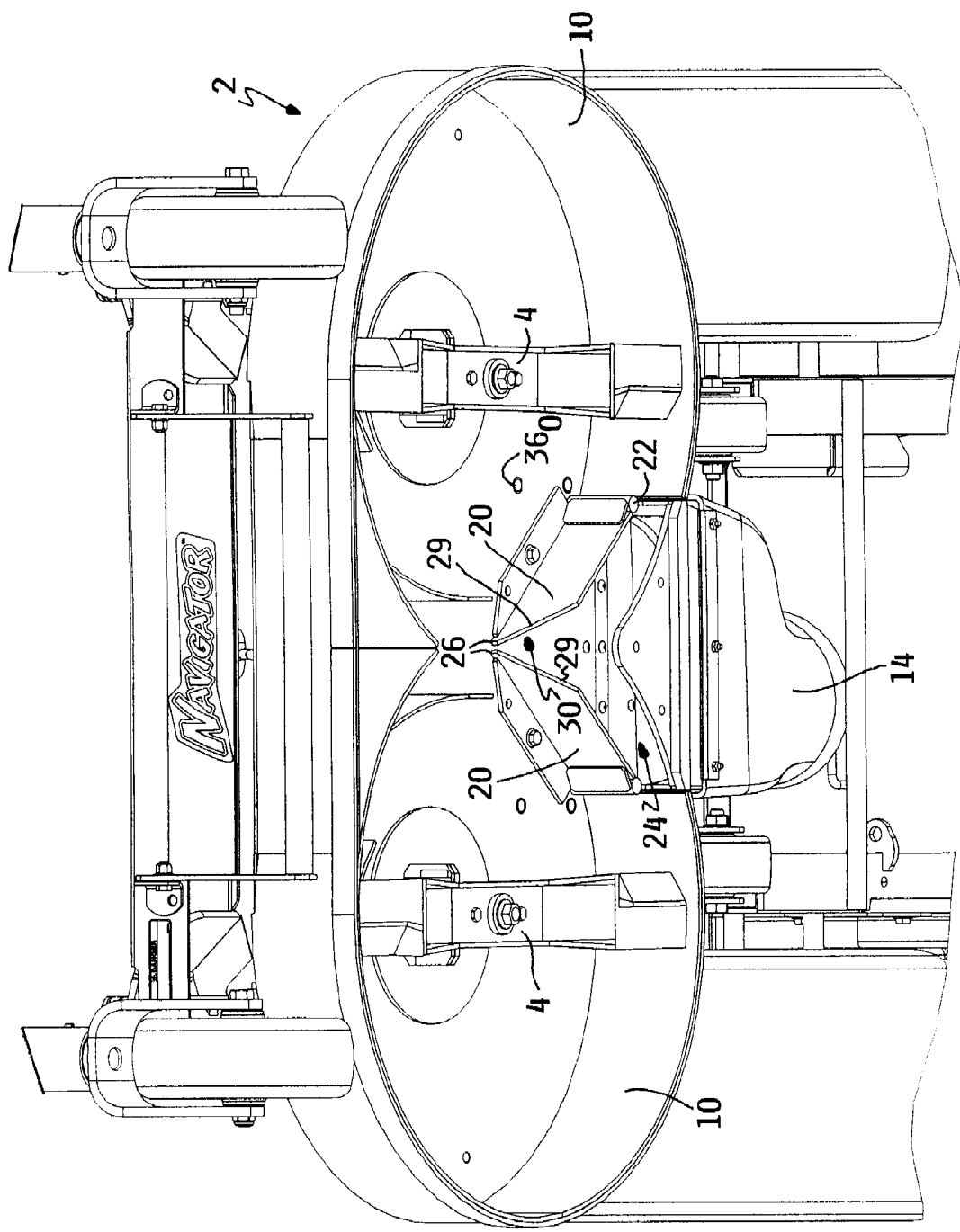
FIG. 4 is a perspective view similar to FIG. 3, particularly illustrating the baffles in their closed position.

The second or closed position of the flow control baffle is shown in FIG. 4. In this position, flow control baffles 20 have been pivoted inwardly from their open position in the manner of a pair of barn doors being closed. In the closed position of flow control baffles 20, baffles 20 are inclined inwardly relative to cutting deck 2 until tips 26 of baffles 20 have been placed next to one another generally along the longitudinal centerline $c_l$ of cutting deck 2. In this position, the two baffles 20 now obstruct or block much of the upper portion of mouth 16 of exit tunnel 14. Thus, at least some of the grass clippings in the grass clipping stream will now be blocked from passing out through the upper portion of exit tunnel 14 and will instead be redirected back into cutting chambers 8 by the inclined slant of baffles 20. Primarily, the grass clipping stream is able to pass into exit tunnel 14 only through the open lower portion 24 of mouth 16 and through whatever gap might exist between tips 26 of baffles 20 when baffles 20 are in their closed position.

In fact, tips 26 of baffles 20 are cut back along a slant 29 so that a triangular gap 30 is provided between baffles 20 when baffles 20 are in their closed position. See FIG. 4. Gap 30 is not provided primarily to increase the amount of the grass clipping stream that is permitted to flow into mouth 16 of exit tunnel 14 though it does that. Instead, the slanted or inclined tips 26 are provided on baffles 20 to prevent grass clippings from catching or hairpinning around tips 26 of baffles 20. The slants 29 on tips 26 help any grass clippings that might hit tips 26 to slide off tips 26 without building up on tips 26.

Figure 1:
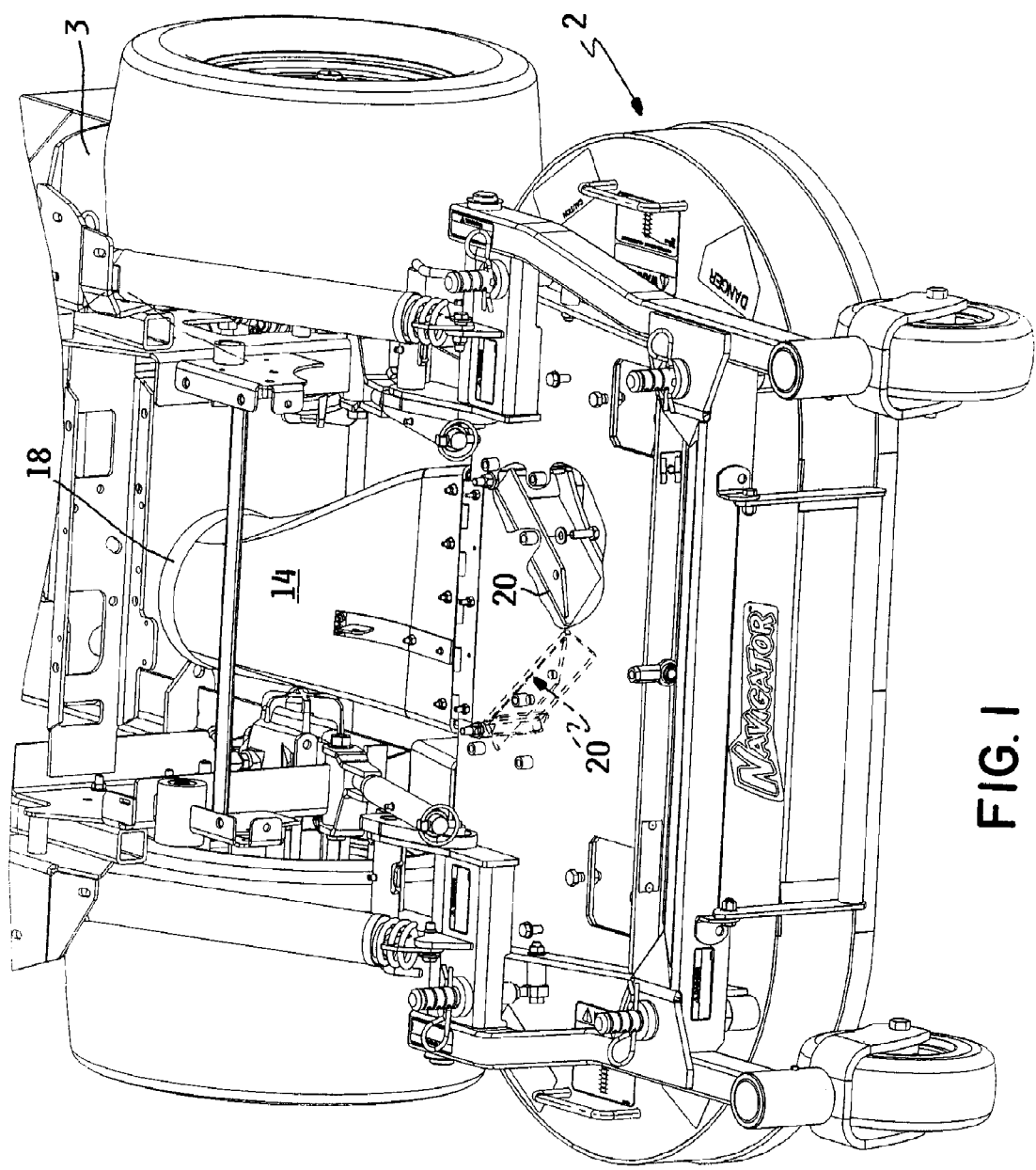
FIG. 1 is a perspective view of a multi-bladed cutting deck coupled to the front of a mower, particularly illustrating the flow control baffles of this invention shown in their closed position.
Figure 2:
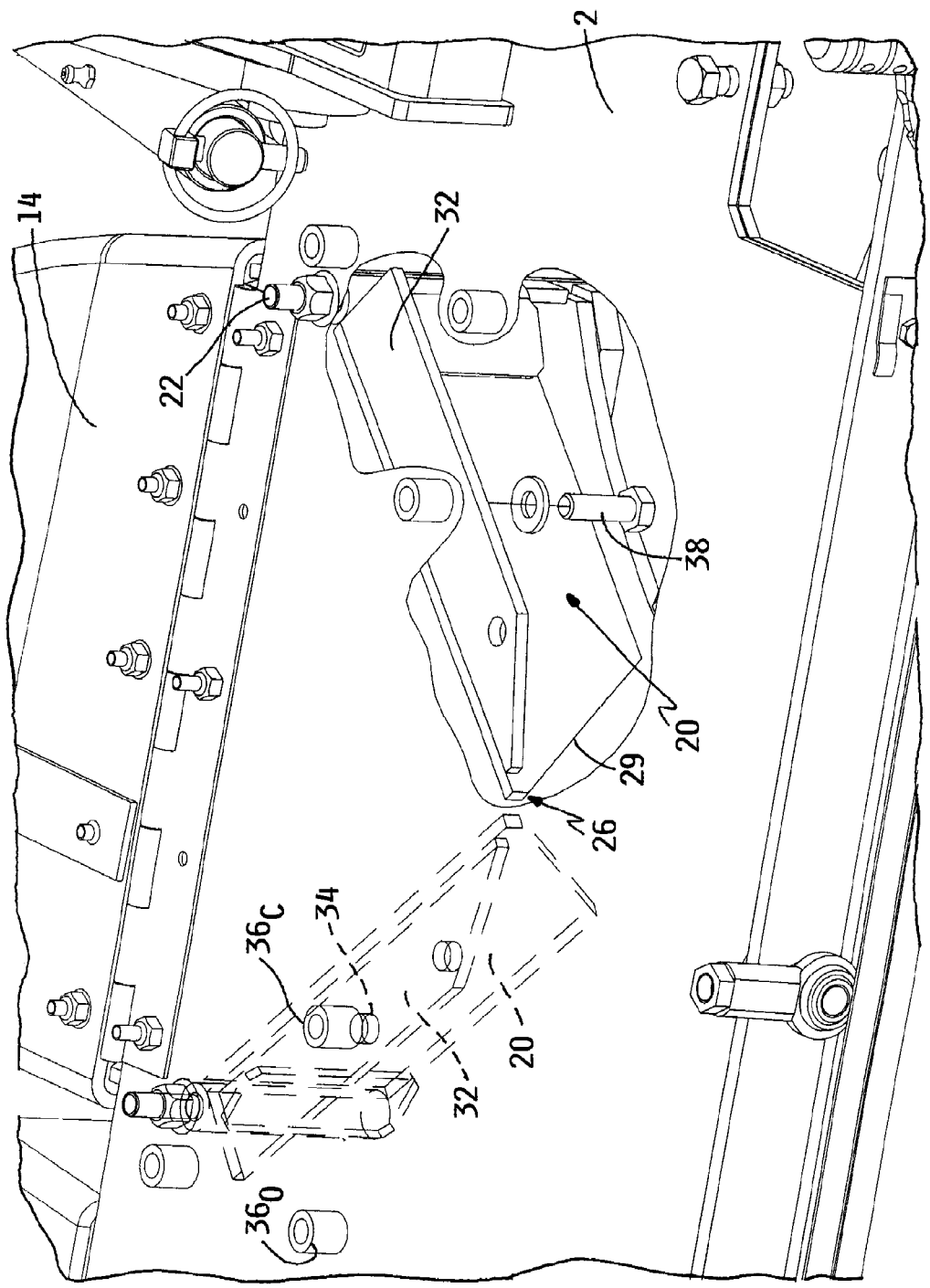
FIG. 2 is an enlarged perspective view of the flow control baffles of FIG. 1.

The operator of the mower can selectively place baffles 20 into either their open position or into their closed position. Each baffle 20 includes a horizontal upper flange 32 with a hole 34 therein. Baffle hole 34 can be aligned with one hole 36 in a pair of holes $36_O$ and $36_C$ in the top wall of cutting deck 2 when baffle 20 is placed in either the open or the closed position thereof, respectively. A bolt 38 can be inserted through the aligned holes 34, 36 and a nut (not shown) tightened on bolt 38 to hold or lock baffle 20 in either its open or its closed position. See FIGS. 1 and 2.

In the open position of baffles 20, baffles 20 cooperate with the front ends of the C-shaped walls 10 of cutting chambers to form channels 28 that help direct the grass clippings into a centralized stream and through mouth 16 of exit tunnel 14. In the closed position of baffles 20, baffles 20 obstruct or block mouth 16 of exit tunnel 14 in a symmetrical manner from each side of exit tunnel 14. This decreases the amount of the grass clipping stream which is being collected in a grass collector attached to exit tunnel 14 and increases the amount of the grass clipping stream that is recirculated into cutting chambers 8 for mulching through the open bottom face of cutting chambers 8. The amount of the grass clipping stream that is blocked by baffles 20 when baffles 20 are closed varies depending upon the grass conditions and the type of blade installed in cutting chambers 8, i.e. whether a bagging or mulching blade is installed. However, approximately 10% to 50% of the grass clipping stream is blocked from entering exit tunnel 14 when baffles 20 are in their closed position.

The advantage of being able to place baffles 20 in their closed position is to increase how long it takes for the grass collector to fill. Thus, an operator has some control over how frequently he or she has to stop to empty the grass collector. If 50% of the grass clipping stream is prevented from entering exit tunnel 14 and falls out through the open bottom face of cutting chamber 8 in a mulching action, then the time between grass dumping operations is doubled. Yet, not all of the grass clipping stream is being mulched thus making it much more likely that the clippings that are being mulched will be well hidden in the cut grass path and will not be visible after the mowing operation is concluded.

While baffles 20 are desirably pivotably mounted on cutting deck 2 to be able to swing or pivot back and forth between their open and closed positions, this need not be the case. Pivot pins 22 could be deleted and baffles 20 simply installed in cutting deck 2 in either the open or the closed positions thereof. Moreover, baffles 20 could have more than two positions with one or more intermediate, partially open, partially closed positions being used. Alternatively, baffles 20 could be infinitely adjustable between their open and closed positions if so desired.

Use of baffles 20 does not place cutting deck 2 into a mulching mode of operation. A significant portion of the grass clipping stream still passes through exit tunnel 14 and is not being driven downwardly out of cutting deck 2 through the open bottom faces of cutting chamber 8. The mulch plug 50 shown in FIGS. 6-8 will be used in place of baffles 20 when cutting deck 2 is to be placed into a mulching mode of operation.

Mulch plug 50 comprises a generally V-shaped plug body 52 having an apex 54 and a pair of arcuate side walls 56 extending rearwardly from apex 54. A small horizontal floor 58 fills in part of the space or gap between side walls 56 along the bottom of plug body 52. Floor 58 has a plurality of mounting holes 60 provided therein. See FIG. 7. Mounting holes 60 match the pattern of various holes 62 provided in a triangular mounting tongue 64 contained along the bottom side of mouth 16 of exit tunnel 14. See FIGS. 3 and 8.

Mounting tongue 64 for mulch plug 50 extends inwardly from exit tunnel 14 relative to cutting deck 2. Floor 58 of mulch plug 50 is overlaid on top of mounting tongue 64 and the holes 60 in floor 58 are aligned with the matching holes 62 in mounting tongue 64. Mulch plug 50 is then bolted in place by a plurality of bolts 66 that pass through the aligned holes 60 and 62. See FIG. 8. When mulch plug 50 is in place, plug body 52 of mulch plug 50 extends across both the full width and height of mouth 16 of exit tunnel 14. This prevents any portion of the grass clipping stream from entering exit tunnel 14, thereby converting cutting deck 2 into a mulching mode of operation in which the grass clippings must fall or be driven out of the open bottom faces of cutting chambers 8 in order to leave cutting deck 2.

The arcuate side walls 56 of plug body 52 of mulch plug 50 are curved similarly to the curve of the C-shaped peripheral wall 10 that defines each cutting chamber. As such, the arcuate side walls 56 of plug body 52 lie outside the orbital paths of cutting blades 4 of cutting chambers 8 and extend the full height of mouth 16 of exit tunnel 14. Apex 54 of plug body 52 of mulch plug 50 lies along the longitudinal centerline $c_l$ of cutting deck 2. However, apex 54 of plug body 52 terminates short of where the orbits of the cutting blades intersect with the longitudinal centerline $c_l$ of cutting deck 2.

As described above, mulch plug 50 does completely block off exit tunnel 14 and would effectively convert cutting deck 2 from a discharge/collection mode of operation to a mulching mode of operation. However, since the grass clippings have been merged into a generally unitary stream of clippings, impacting such a clipping stream against the face of mulch plug 50, i.e. against apex 54 and the arcuate side walls 56, could cause the clippings to fall out in a clumps along the center of cutting deck 2.

To address this clumping or uneven distribution problem, the front face of mulch plug 50 is provided with a central, vertical separation vane 70 that extends forwardly from apex 54 of mulch plug 50. Vane 70 extends quite far forwardly relative to cutting deck 2 such that the forwardmost portion of vane 70 approaches the axes of rotation of cutting blades 4. Because vane 70 passes over the intersection of the orbits of the two cutting blades 4, the height of vane 70 has to be shorter than the height of apex 54 to provide clearance to cutting blades 4. In addition, the leading edge 72 of vane 70 is inclined or slanted much the like the inclined tips 26 of baffles 20. This is to prevent grass from catching or hairpinning on vane 70 of mulch plug 50.

The purpose of vane 70 is to prevent the grass clippings that come from each cutting chamber from merging into a centralized grass clipping stream. In effect, vane 70 extends far enough forwardly that it keeps the grass clippings created in each cutting chamber 8 substantially isolated from one another. This significantly improves the mulching performance of mulch plug 50 since a centralized grass clipping stream is not formed in the first place. Rather, the clippings in each cutting chamber 8 are kept circulating within each cutting chamber until they fall out of cutting chamber 8.

To assist in driving the grass clippings in each cutting chamber downwardly out of cutting chamber 8, an inclined or slanted deflector plate 74 is installed between each arcuate side wall 26 of mulch plug 50 and one side of vane 70. Again, because deflector plate 74 ends up overlying part of the orbit of rotation of cutting blade 4 in cutting chamber 8, deflector plate 74 has a reduced height similar to the reduced height of vane 70 as compared to the full height of the arcuate side walls 56 or apex 64 of mulch plug 50. This provides the requisite blade clearance.

Each deflector plate 74 is a flat plate that bridges the space between one arcuate side wall 56 and one side of vane 70. Deflector plate 74 is long enough so that it extends between and blocks off the open part 12 of the C-shaped wall 10. Thus, grass clippings traveling around cutting chamber 8 engage vane 70 and the inclined face of deflector plate 74. Deflector plate 74 serves to retain the grass clippings within cutting chamber 8 and to deflect the grass clippings downwardly relative to cutting chamber 8 to allow the grass clippings to be recut by cutting blades 4 and/or to be driven down through cutting blades 4 into the cut grass path.

The presence of separator vane 70 and deflector plates 74 on the front face of the V-shaped mulch plug 50 is preferred. Mulching performance is improved if they are present as measured by the ability of cutting deck 2 to smoothly and evenly distribute the grass clippings in the cut grass path without substantial clumping. To put cutting deck 2 into the mulching mode of operation thereof, the operator removes baffles 20 of FIGS. 1-5 and installs mulch plug 50 of FIGS. 6-8.

Figure 9:
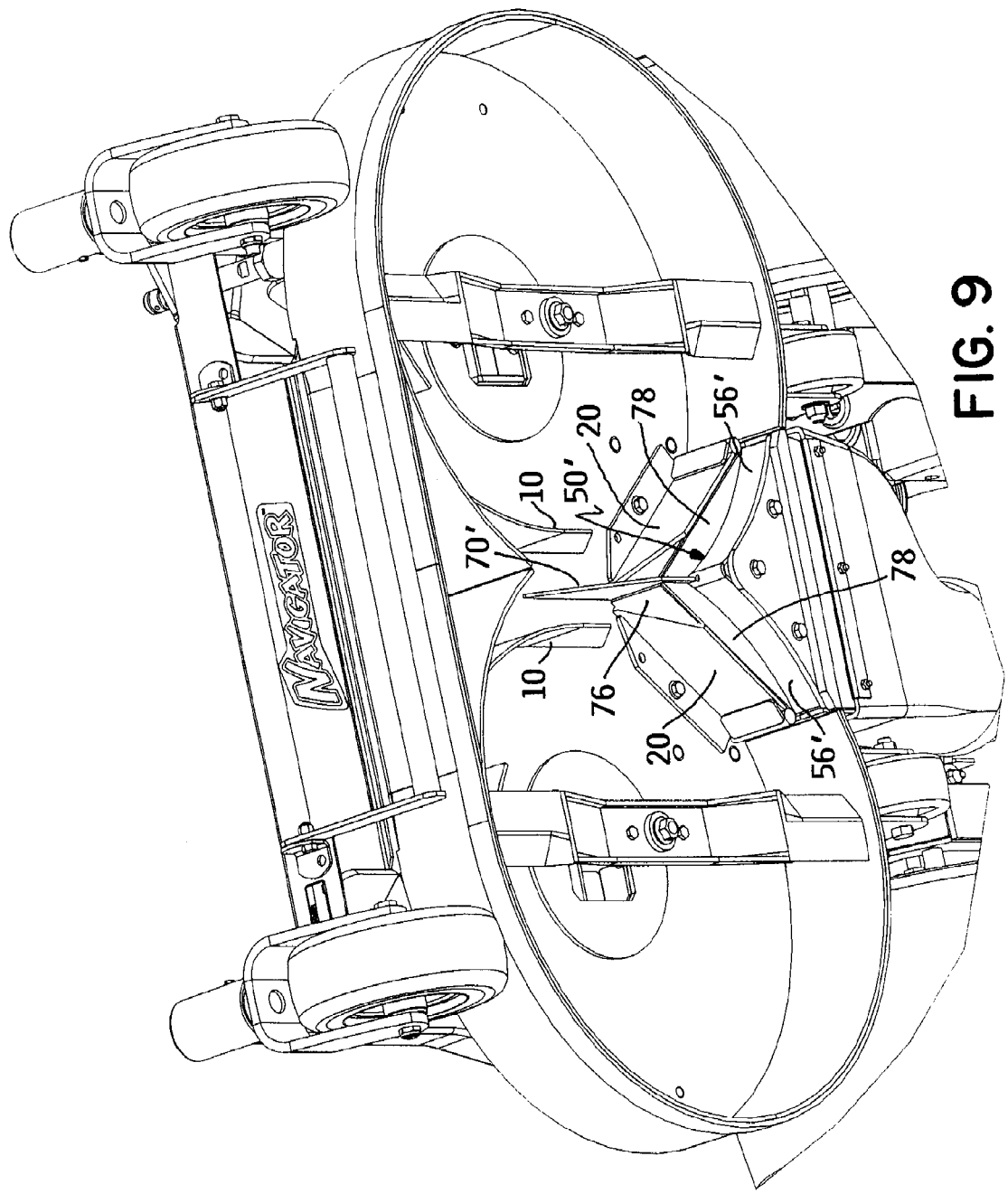
FIG. 9 is a perspective view of the underside of the cutting deck and of a second embodiment of a mulching plug of FIG. 6, particularly illustrating the mulching plug installed in the deck in concert with the flow control baffles.

FIG. 9 discloses another embodiment of mulch plug 50' which is designed to work in concert with baffles 20 of FIGS. 1-5. In this mulch plug, deflector plates 74' of mulch plug 50' are formed in part by baffles 20 when baffles 20 are in their closed position as well as by triangular gussets 76 carried on the sides of vane 70'. Gusset 76 on each side of vane 70' helps fill in the triangular gap 30 that is normally formed between baffles 20 when baffles 20 are in their closed position. Thus, on each side of vane 70', deflector plate 74 now comprises the triangular gusset 76 and the face of baffle 20 which is aligned with gusset 76 as shown in FIG. 9. Preferably, in this version of mulch plug 50', each gusset 76 is carried on a bottom ledge 78 that fills in the space between the lower edges of gusset 76 and baffle 20 and the side wall 56' of mulch plug 50'.

Figure 6:
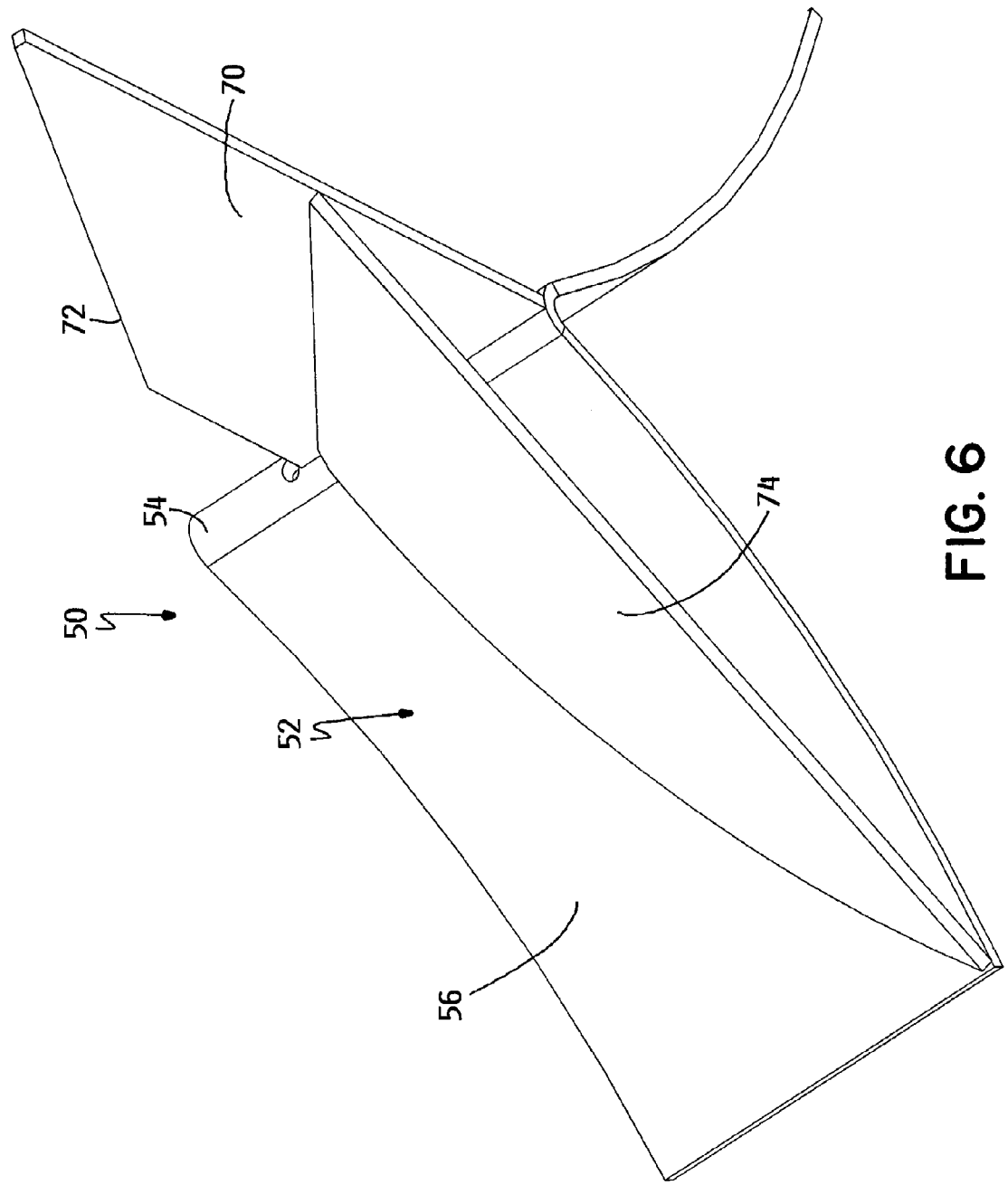
FIG. 6 is a perspective view of a mulching plug of this invention.
Figure 7:
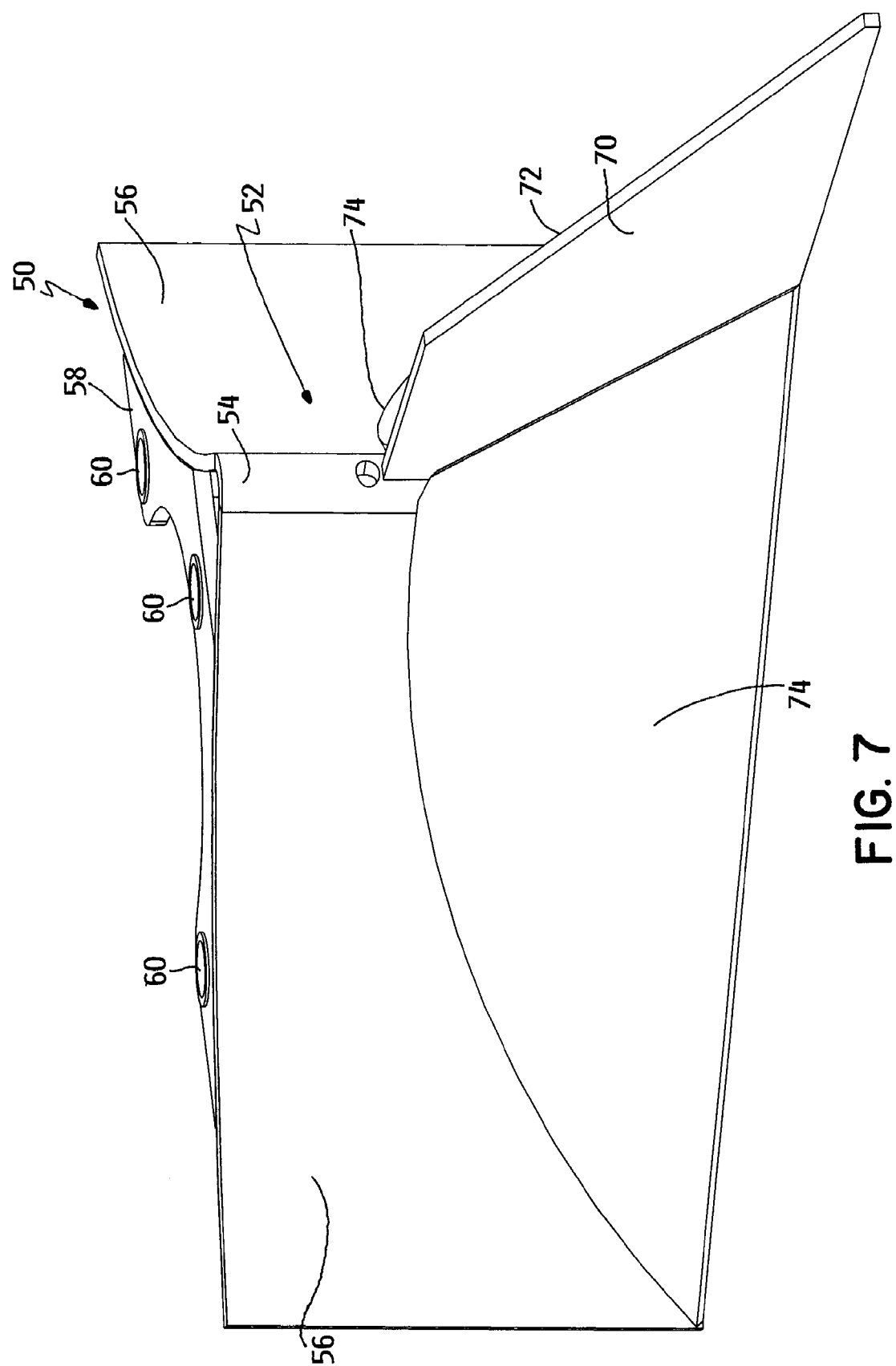
FIG. 7 is another perspective view of the mulching plug of FIG. 6.
Figure 8:
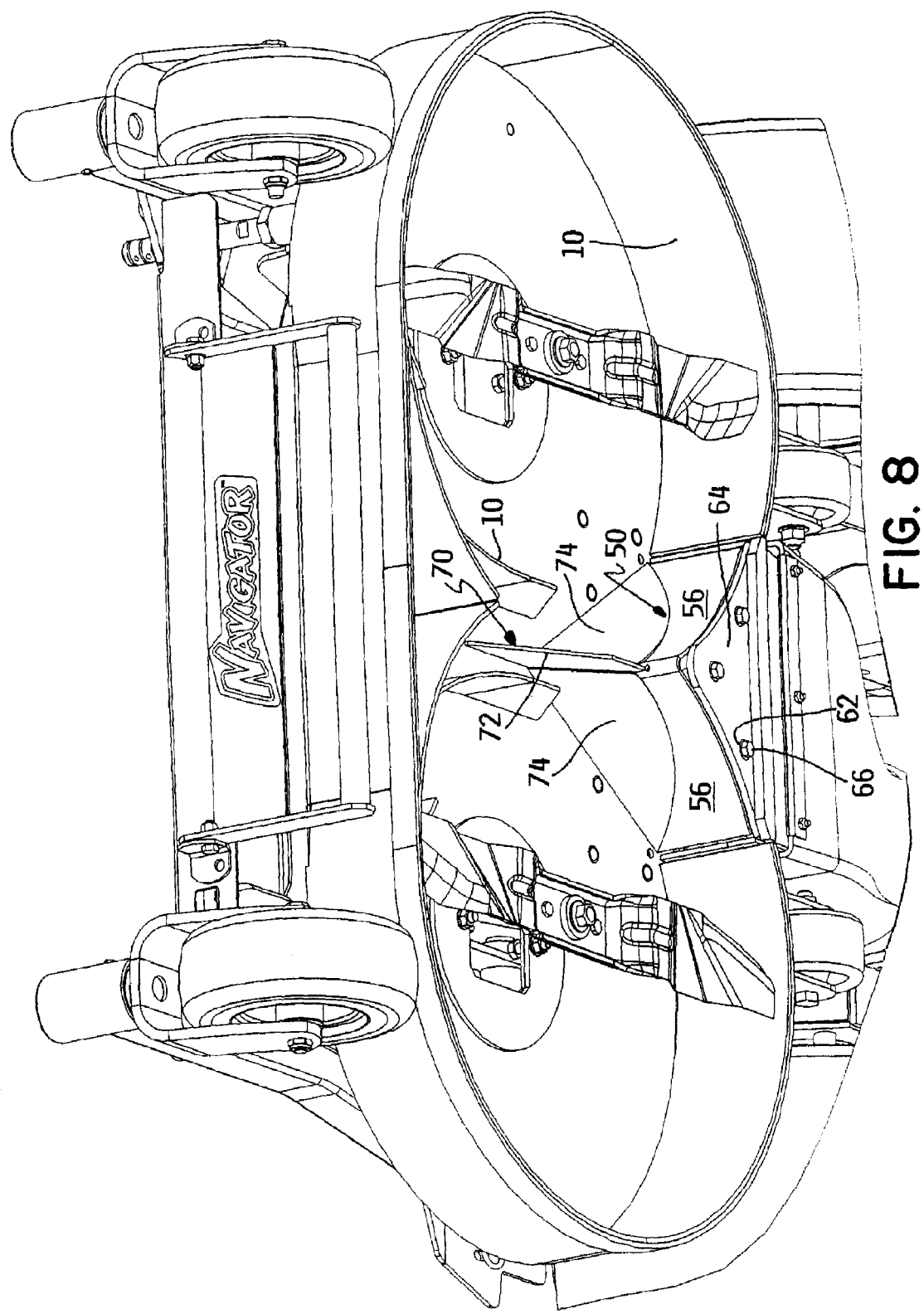
FIG. 8 is a perspective view of the underside of the cutting deck and of the mulching plug of FIG. 6, particularly illustrating the mulching plug installed in the deck in place of the flow control baffles.

Mulch plug 50' of FIG. 9 will function generally identically as that of FIGS. 6-8. Separator vane 70' keeps the grass clippings in each cutting chamber 8 substantially separate from one another. The front end of separator vane 70' extends forwardly beyond the open parts 12 of C-shaped walls 10 of each cutting chamber. Thus, the grass clippings circulating around in contact with the walls 10 will not depart the walls 10 until vane 70' is reached. Thus, vane 70' is effective in keeping the grass clippings in each cutting chamber 8 substantially separate from one another. Deflector plates 74' formed by gussets 76 and baffles 20 are then effective in deflecting the grass clippings downwardly in the same manner as the unitary deflector plates 74 on the embodiment of mulch plug 50 shown in FIGS. 6-8.

Various modifications of this invention will be apparent to those skilled in the art. Thus, the scope of this invention is to be limited only by the appended claims.

We claim:

1. A rotary cutting deck for a mower, which comprises:
    (a) a cutting deck having a pair of cutting chambers with rotary cutting blades that discharge grass clippings through a common exit tunnel, the exit tunnel having a mouth through which the grass clippings pass to enter the exit tunnel;
    (b) a pair of baffles that can be selectively positioned by an operator in closed positions on the cutting deck in advance of the exit tunnel in the path of the grass clippings approaching the mouth of the exit tunnel; and
    (c) wherein the baffles in their closed positions collectively block at least a portion of the mouth of the exit tunnel, wherein the baffles in their closed positions are symmetrically arranged on either side of a centerline of the mouth of the exit tunnel.

2. The rotary cutting deck of claim 1, wherein the baffles in their closed positions each extend inwardly from adjacent one side of the mouth of the exit tunnel towards the centerline of the mouth of the exit tunnel.

3. The rotary cutting deck of claim 1, wherein the exit tunnel extends rearwardly along a longitudinal centerline of the cutting deck.

4. The rotary cutting deck of claim 1, wherein the baffles can further be selectively positioned by the operator in an open position on the cutting deck, wherein the baffles in their open positions do not block the mouth of the exit tunnel but are oriented to guide grass clippings from each cutting chamber into the mouth of the exit tunnel.

5. The rotary cutting deck of claim 4, wherein the baffles in their open positions cooperate with a portion of a wall that defines each cutting chamber to form a guide channel that points towards the mouth of the exit tunnel to direct grass clippings through the channel towards the mouth of the exit tunnel.

6. The rotary cutting deck of claim 4, wherein the baffles are pivotally secured to the cutting deck to pivot back and forth about substantially vertical pivot axes between their open and closed positions.

7. The rotary cutting deck of claim 4, wherein the baffles have a height which is less than a height of the mouth of the exit tunnel such that a portion of the mouth of the exit tunnel is continuously open even when the baffles are in their closed positions.

8. The rotary cutting deck of claim 1, wherein the baffles in their closed positions collectively block some but not all of the mouth of the exit tunnel to decrease but not completely stop the flow of grass clippings into the exit tunnel.

9. A rotary cutting deck for a mower, which comprises:
 (a) a cutting deck having a pair of cutting chambers with rotary cutting blades that discharge grass clippings through a common exit tunnel, the exit tunnel having a mouth through which the grass clippings pass to enter the exit tunnel;
 (b) a pair of baffles that can be selectively positioned by an operator in closed positions on the cutting deck in advance of the exit tunnel in the path of the grass clippings approaching the mouth of the exit tunnel;
 (c) wherein the baffles in their closed positions collectively block at least a portion of the mouth of the exit tunnel; and
 (d) wherein the baffles can further be selectively positioned by the operator in open positions on the cutting deck, wherein the baffles in their open positions do not block the mouth of the exit tunnel, wherein the baffles extend inwardly relative to the cutting chambers in the open positions thereof such that each baffle overlies an orbit of the cutting blade contained in a different one of the cutting chambers, wherein the height of the baffles is short enough such that the baffles terminate above the blades to provide clearance to rotation of the blades.

10. A rotary cutting deck for a mower, which comprises:
 (a) a cutting deck having dual, side-by-side, downwardly facing cutting chambers having generally C-shaped peripheral walls with an open part, wherein the C-shaped peripheral walls that define the cutting chambers face one another with the open parts of the C-shaped peripheral walls facing one another over a central portion of the cutting deck;
 (b) a cutting blade contained in each cutting chamber, wherein each cutting blade is rotatable about a substantially vertical axis in a horizontal cutting plane to cut grass and create grass clippings, wherein the cutting blades in the dual chambers rotate in opposite directions;
 (c) a rearwardly extending exit tunnel located on the cutting deck between the rotational axes of the cutting blades in a position to intercept the grass clippings created by the cutting blades, wherein the exit tunnel has a forwardly facing mouth through which the grass clippings pass to enter the exit tunnel; and
 (d) a pair of pivotal flow control baffles pivotally attached to the cutting deck adjacent opposite lateral sides of the mouth of the exit tunnel and extending forwardly therefrom, each flow control baffle being pivotal between an open position in which the flow control baffle clears the mouth of the exit tunnel and helps direct grass clippings from an adjacent cutting chamber into the mouth and a closed position in which the flow control baffle partially but does not completely block the mouth of the exit tunnel to prevent a portion of the grass clippings from the adjacent cutting chamber from entering the mouth of the exit tunnel.

11. The rotary cutting deck of claim 10, wherein approximately 10% to 50% of the grass clippings are blocked from entering the exit tunnel when the baffles are in their closed position.

12. A rotary cutting deck for a mower, which comprises:
 (a) a cutting deck having a pair of cutting chambers with rotary cutting blades that discharge grass clippings through a common exit tunnel, the exit tunnel having a mouth through which the grass clippings pass to enter the exit tunnel, wherein the mouth has a predetermined width between opposite lateral sides of the mouth;
 (b) a pair of baffles that can be selectively positioned by an operator in open and closed positions on the cutting deck in advance of the exit tunnel in the path of the grass clippings approaching the mouth of the exit tunnel;
 (c) wherein the baffles in the open positions thereof are spaced apart from one another by a distance that is at least approximately equal to the width of the mouth of the exit tunnel so that the flow of grass clippings into the mouth of the exit tunnel is not substantially blocked by the baffles; and
 (d) wherein the baffles in their closed positions thereof are positioned closer together relative to one another than when the baffles are in their open positions such that the baffles in their closed positions at least partially block the flow of grass clippings into the mouth of the exit tunnel.

13. The rotary cutting deck of claim 12, wherein the baffles in their open positions are substantially parallel to one another such that the grass clippings are substantially free to flow between the baffles as the grass clippings approach the mouth of the exit tunnel.

14. The rotary cutting deck of claim 13, wherein the baffles in their closed positions are inclined towards one another to form an inverted V-shape in the flow of grass clippings towards the mouth of the exit tunnel.

15. The rotary cutting deck of claim 14, wherein the baffles in their closed positions have tips that are adjacent one another at an apex of the V-shape.

16. The rotary cutting deck of claim 12, wherein each baffle in the open position thereof protrudes at least partially into a different one of the cutting chambers to direct the grass clippings from the cutting chamber towards the mouth of the exit tunnel.

17. The rotary cutting deck of claim 12, wherein the baffles in their closed positions collectively block some but not all of the mouth of the exit tunnel to decrease but not completely stop the flow of grass clippings into the exit tunnel.

* * * * *